June 2, 1970   E. MEYER   3,515,149
APPARATUS FOR SMOOTHING AND DESTALKING TOBACCO LEAVES
Filed March 18, 1968                                                2 Sheets-Sheet 1
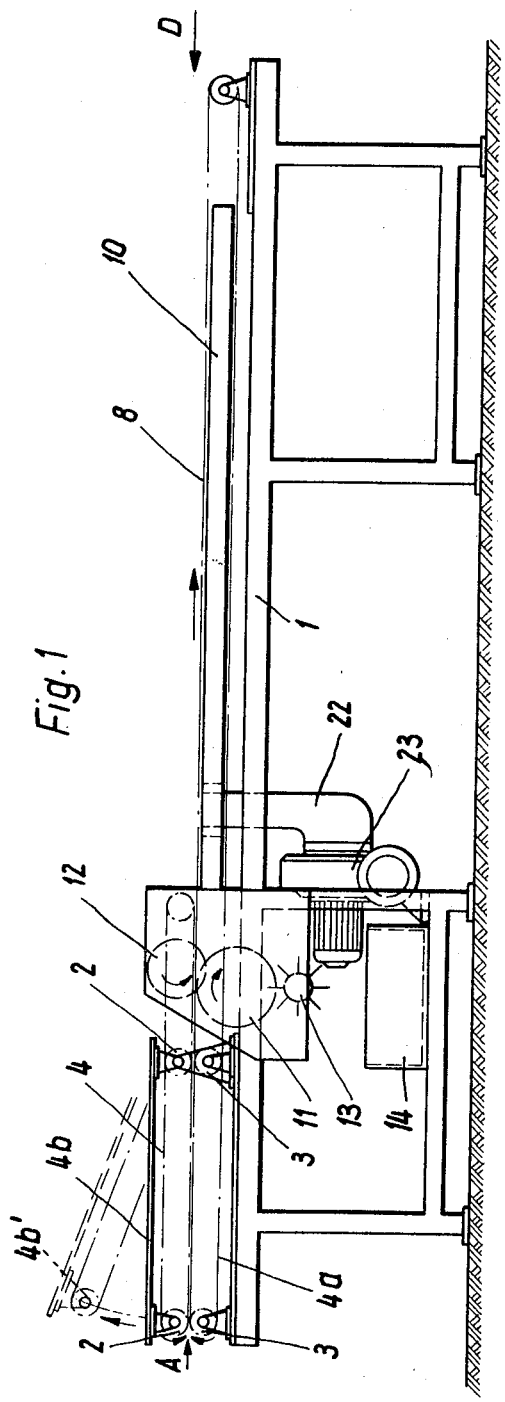
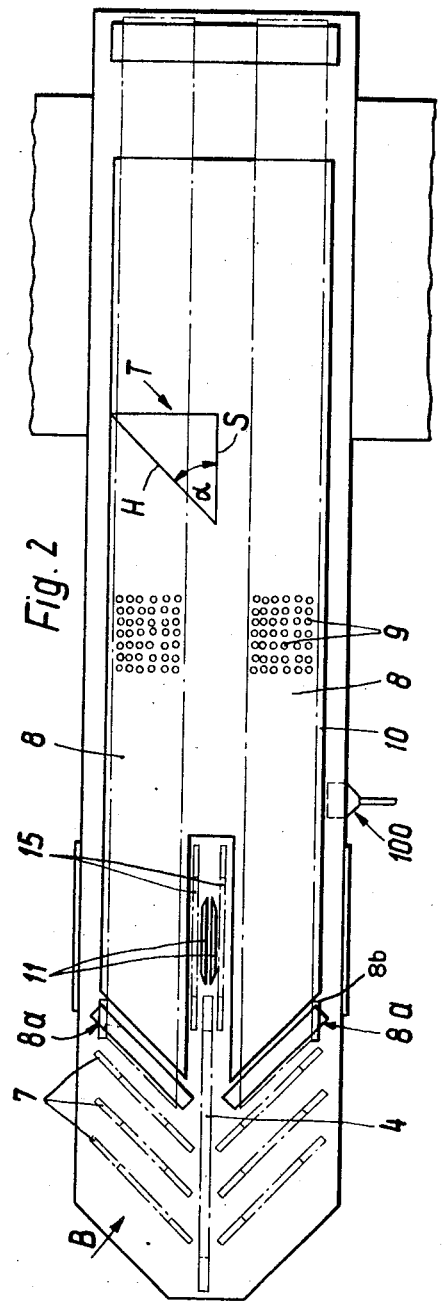
Inventor:
Erich Meyer
by Michael S. Striker
his attorney

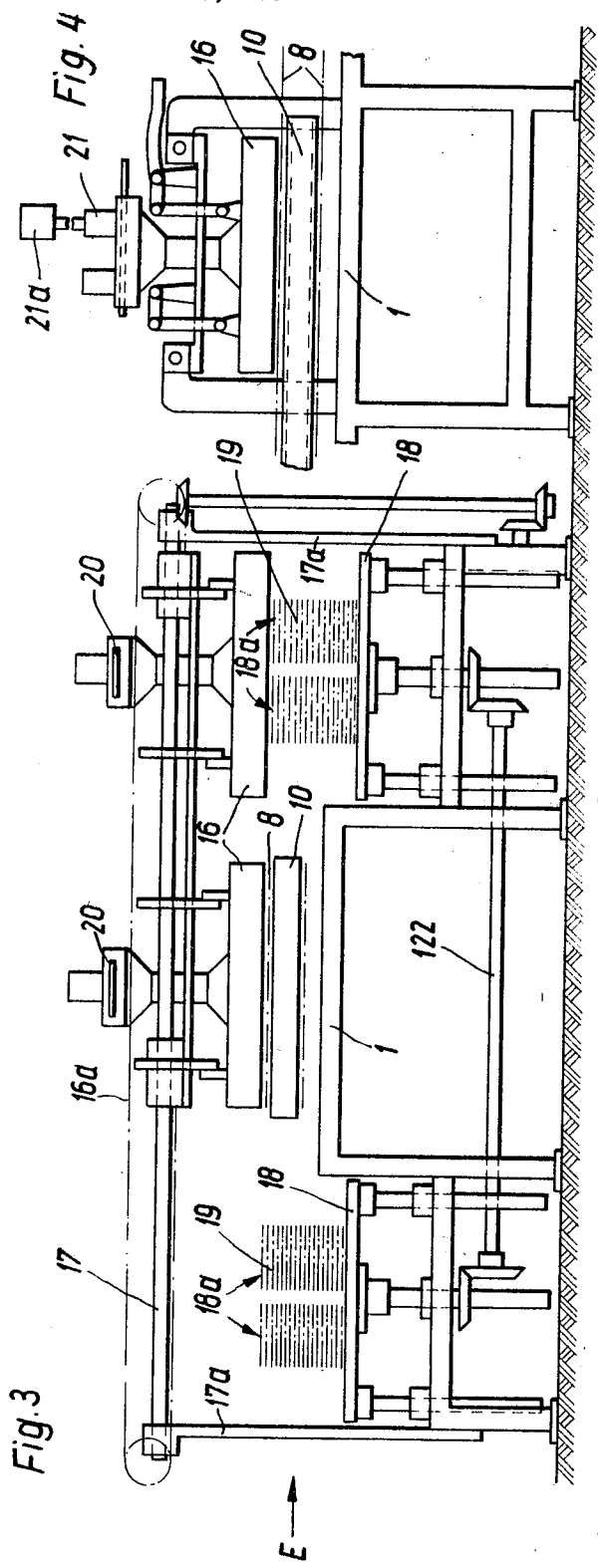

United States Patent Office
3,515,149
Patented June 2, 1970

3,515,149
APPARATUS FOR SMOOTHING AND DESTALKING TOBACCO LEAVES
Erich Meyer, Spradow, near Bunde, Germany, assignor to Brockfeld & Meyer, Spradow, near Bunde, Germany
Filed Mar. 18, 1968, Ser. No. 713,887
Claims priority, application Germany, Mar. 17, 1967, B 91,653
Int. Cl. A24b 5/14
U.S. Cl. 131—125                                 6 Claims

ABSTRACT OF THE DISCLOSURE

Tobacco leaves are spread open, smoothed and destalked in an automatic machine wherein the central stems of successive leaves are engaged by a pair of endless belts to move lengthwise toward a cutting device which severs the leaves at both sides of the stems to separate the stems from laminae. The laminae are smoothed by a pair of smoothing units, one on each side of the endless belts, during travel of respective stems toward the cutting station. Each unit has several pairs of parallel carded aprons which make acute angles with the advancing direction of the endless belts.

BACKGROUND OF THE INVENTION

The present invention relates to apparatus for treating tobacco leaves, particularly to treatment of tobacco leaves whose laminae are to be used as outer wrappers for cigars, cigarillos or like tobacco products.

Tobacco leaves which are intended for use as outer wrappers for cigarillos or cigars must be spread open, smoothed and their centrally located stems separated from laminae. The thus separated and smoothed laminae are then ready to be used as wrappers. Until recently, the spreading, smoothing and destalking operations were carried out exclusively by hand. As of late, the stems or ribs are separated from laminae by mechanical destalking devices, which, however, fail to reduce appreciably the overall time needed for the production of wrappers because the spreading and smoothing operations are still carried out by hand.

SUMMARY OF THE INVENTION

An object of the invention is to provide an apparatus which is capable of treating large and small leaves with equal efficiency, which can automatically collect separated stems, and which can automatically collect laminae in the form of stacks which are ready for transfer into a cigar or cigarillo wrapping machine.

An additional object of my invention is to provide an apparatus wherein the stems are separated from laminae with a minimum of waste, wherein the laminae are spread open and smoothed without breakage or other damage thereto, and wherein a desired number of tobacco leaves may be processed in rapid sequence and at a desired speed.

Still another object of the invention is to provide novel conveying, destalking, smoothing and stacking means for use in an apparatus of the just outlined character.

A concomitant object of the invention is to provide the apparatus with automatic collecting means for the stems.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic side elevational view of an apparatus which embodies the invention;

FIG. 1a is a schematic end elevational view of the conveyor which transports the stems of tobacco leaves, as seen in the direction of arrow A in FIG. 1;

FIG. 2 is a schematic top plan view of the apparatus;

FIG. 2a is a fragmentary side elevational view of two carded aprons in the apparatus as seen in the direction of arrow B in FIG. 2;

FIG. 3 is an enlarged end elevational view of the apparatus as seen in the direction of arrow D in FIG. 1;

FIG. 4 is a side elevational view of the structure shown in FIG. 3 as seen in the direction of arrow E; and FIG. 5 is a top plan view of the structure shown in FIG. 3.

DESCRIPTION OF THE PREFERRED EMBODIMENTS

The apparatus of my invention comprises a substantially horizontal table or support 1 which supports a plate-like carrier 4b swingable between an operative position shown in FIG. 1 by solid lines and a raised or inoperative position shown by phantom lines, as at 4b′. The table 1 supports two rollers 3 for an endless belt 4a which forms part of a conveyor serving to advance the centrally located stems or ribs of successive tobacco leaves which are fed in a direction from the left to the right, as viewed in FIGS. 1 or 2. The conveyor further includes a second endless belt 4 which is trained around rollers 2 mounted on the carrier 4b. As shown in FIG. 1a, the rollers 2 but preferably also the rollers 3 are grooved so that the stringers of the belts 4, 4a exhibit a transversely concave profile and provide channels for the stems. When the carrier 4b is moved to operative position, the lower stringer of the upper belt 4 is sufficiently close to the upper stringer of the lower belt 4a to properly engage and transport the stem of a tobacco leaf so that the stem moves lengthwise toward a cutting or severing station which is located to the right of the carrier 4b. The directions in which the belts 4, 4a advance are indicated by arrows. The leaves can be fed by hand or by an automatic feeder, not shown.

The spreading and smoothing means of the apparatus comprises two smoothing units which are located at the opposite sides of the belts 4, 4a and each of which includes a series of endless belts 7 (hereinafter called aprons to distinguish from the belts 4, 4a) provided with bristles or cardings 6. The belts 4, 4a make acute angles with the aprons 7 (see FIG. 2) and these aprons are trained around driven rollers 5 mounted in part on the table 1 and in part on the carrier 4b. When the latter is moved to operative position, some of the aprons 7 (namely, those which are trained over rollers mounted on the carrier) are substantially coplanar with the upper belt 4, the remaining aprons being substantially coplanar with the lower belt 4a. In order to avoid damage to laminae of tobacco leaves, the drive which advances the belts 4, 4a is synchronized with the drive for aprons 7 so that the ratio of speed of belts 4, 4a to speed of aprons 7 is the same as the ratio of the length of one side S to the hypotenuse H of a right triangle T indicated in FIG. 2 by a heavy line. The hypotenuse H makes with the side S an acute angle alpha which is the same as that between the belt 4 or 4a and one of the aprons 7. The aprons 7 can be replaced by rollers which are provided with bristles or like smoothing elements. The carrier 4b is swung to inoperative position when it becomes necessary to clean the apparatus in the zone around the lower belt 4a and around the lower aprons 7. It is further preferred to mount the carrier 4b in such a way that it can be moved up and down when in operative position so as to alter the distance between the upper stringer of the belt 4a and the lower stringer of the belt 4 and to simultaneously change the distance between the upper and lower aprons 7. This is necessary to insure a satisfactory spreading and smoothing action for different types and sizes of tobacco leaves. The means for changing the setting of the carrier 4b in operative position may include threaded feed screws or any other suitable adjusting means.

When the laminae of a tobacco leaf advance beyond the aprons 7, they are engaged by two transporting conveyors each of which includes an elongated endless perforated band 8. These bands are located at the opposite sides of the belts 4, 4a (see FIG. 2) and their trailing rollers 8a are inclined in the same way as the aprons 7. The bands 8 are held on rollers 8a by conventional stationary guides 8b. The upper stringers of the bands 8 are located in a common horizontal plane and the perforations or apertures of these bands are shown at 9. Suction chambers 10 are mounted on the table 1 at a level below the upper stringers of bands 8 to draw air through the perforations 9 and to thus hold the laminae of successive tobacco leaves by pneumatic action. The top panel of each suction chamber 10 has a large number of suction ports, not shown. The chambers 10 are connected with a suction conduit 22 whose outlet is connected to the suction side of a fan 23. Suction in the chambers 10 is strong enough to prevent curling of smoothed tobacco laminae and to insure satisfactory advance of laminae past the severing station. This severing station is located downstream of the belts 4, 4a in the zone between the bands 8. It accommodates a severing unit which includes two lower knives or cutters 11 rotatable about a common horizontal axis and a counterknife 12 which serves to bias the stems of successive tobacco leaves into the space between the lower knives 11 so that the knives sever the leaves at both sides of the stems and thus separate the stems from laminae. The loading ends of severed stems are moved into the range of a spiked ejector wheel 13 which directs them into a collecting receptacle 14.

In order to prevent the laminae from moving upwardly during severing of respective tobacco leaves, the apparatus preferably comprises presser belts or bands 15 which flank the lower knives 11 (see FIG. 2) and are driven at the speed of the bands 8. The lower stringers of belts 15 press the adjacent portions of laminae downwardly. These belts 15 are rather short, i.e., they need not extend substantially beyond the intake and discharge ends of the severing station.

The means for pneumatically removing separated laminae 19 from the bands 8 comprises two transfer members 16 here shown as suction heads which are movable sideways (see FIG. 3) between receiving positions (see the left-hand suction head 16 of FIG. 3) in which a suction head can simultaneously remove two laminae 19 and discharging positions (see the right-hand suction heat of FIG. 3) in which they deposit laminae onto vertically movable receiving platforms 18 laterally adjacent to the table 1. The control means for regulating movements of suction heads 16 between receiving and discharging positions preferably includes a photoelectric cell 100 (FIG. 2) or a like detector which scans the bands 8 at or near to the severing station and causes one of the suction heads to move to receiving position when a pair of laminae approaches the transfer station. At the same time, the other suction head moves to discharging position. The cell can control movements of suction heads 16 by way of a mechanical, pneumatic or other motion transmitting system which is not specifically shown in the drawing. The suction heads 16 are also movable up and down by means of links shown in FIG. 4, and the arrangement is preferably such that the suction head which reaches the receiving position moves downwardly and is simultaneously connected with a suction generating device (for example, with the fan 23) to lift the adjoining laminae 19 off the bands 8. The thus loaded suction head 16 is then moved upwardly and thereupon sideways to its discharging position. As shown in FIG. 3, the suction heads 16 are movable between receiving and discharging positions along transversely extending horizontal guide rods 17 supported by bracket 17a which are secured to the table 1. The receiving platforms 18 descend automatically at regular intervals or continuously and such lowering of platforms is effected by a system of gears which are shown in FIG. 3 and include a horizontal synchronizing shaft 122 located at a level below the top of table 1 and extending in parallelism with the guide rods 17. When a suction head 16 reaches its discharging position, it is caused to move downwardly toward the respective paltform 18 and to press the two laminae 19 against the uppermost laminae of the respective stacks 18a. The connections between the suction heads 16 and the suction generating device or devices comprise valves 20 which close when the respective suction heads complete the compression of respective stacks 18a so that such suction heads can rise again without lifting the freshly transferred pair of laminae 19. If desired, the suction heads 16 may be coupled with supply conduits 21 which connect them with a source 21a of compressed gas (preferably air) and contain valves (not shown) which open when a head 16 is about to rise in its discharging position. The head 16 then discharges a jet of compressed gas which insures that the laminae are invariably separated from its underside.

The gears which lower the platform 18 are preferably controlled by a system which is independent of the drive or drives for belts 4, 4a, aprons 7, bands 8 and presser belts 15. For example, the drive for the platforms 18 may respond to the weight of stacks 18a thereon. It is preferred to operate the drive for the platforms 18 in such a way that the stacks 18a are lowered at the time when the corresponding suction heads 16 descend in their discharging positions and exert a certain pressure upon the respective stacks.

While the apparatus of my invention could operate with a single suction head 16, it is preferred to employ two suction heads because the tobacco leaves can be fed at a much higher speed. It was found that the apparatus can operate properly when the leaves are fed one after the other without any intervals. The intervals required to move one of the suction heads 16 from receiving to discharging position and to simultaneously move the other suction head from discharging to receiving position are very short. As a matter of fact, the two suction heads can be rigidly connected to each other for movement along the guide rods 17; all that is necessary is to mount each suction head in such a way that it can move up and down with reference to its carriage, i.e., with reference to that portion which travels along the guide rods 17.

FIG. 3 shows an endless transporting belt or rope 16a which is coupled to the carriages of suction heads 16 and is moved back and forth to transport the suction heads between receiving and discharging positions. The roller or rollers for the rope 16a can be rotated back and forth by a rack-and-pinion drive, by a hydraulic or pneumatic cylinder, by an electromagnet, or the like.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. Apparatus for smoothing and destalking tobacco leaves wherein a stem separates two laminae, comprising conveyor means including a pair of endless flexible elements having adjacent stringers travelling in the same direction to engage the stems of leaves and to advance the stems lengthwise, one of said stringers being located at a level above the other stringer; smoothing means including a pair of smoothing units located at the opposite sides of said conveyor means and each including several pairs of parallel elongated travelling aprons making acute angles with the advancing direction of said stringers and having bristle-like smoothing elements which engage and smooth laminae of leaves whose stems are engaged and advanced by said stringers, each of said pairs of aprons including an upper apron having a lower stringer which is substantially coplanar with said one stringer and a lower apron having an upper stringer which is substantially coplanar with said other stringer and travels in the same direction as said lower stringer; and severing means located past said stringers and having cutters arranged to sever successive leaves at both sides of the respective stems to separate smoothed laminae therefrom.

2. Apparatus as defined in claim 1, wherein said cutters include a pair of spaced rotary cutters disposed at one side of a leaf which advances beyond said stringers and flanking the stem of such leaf and a counterknife located at the opposite side of the leaf and arranged to bias the stem into the space between said rotary cutters whereby the cutters sever the leaf.

3. Apparatus as defined in claim 1, further comprising second conveyor means arranged to engage the laminae of leaves downstream of said said smoothing unit and to transport such laminae beyond said severing means.

4. Apparatus as defined in claim 3, wherein said second conveyor means comprises endless perforated bands and a suction chamber adajcent to one side of each band to draw laminae against the other sides of said bands.

5. Apparatus as defined in claim 1, wherein said endless flexible elements are belts and wherein at least one of said stringers is transversely concave to form a channel for the stems.

6. Apparatus as defined in claim 1, further comprising means for driving said endless flexible elements and said aprons at speeds whose ratio is the same as that of the length of one side to the length of hypothenuse of a right triangle wherein the side and hypothenuse make an acute angle equal to said aforementioned angles.

References Cited

UNITED STATES PATENTS

| | | | |
|---|---|---|---|
| 534,147 | 2/1895 | Fries | 131—123 |
| 662,212 | 11/1900 | Williams | 131—125 |
| 713,057 | 11/1902 | Bush | 131—123 |
| 901,000 | 10/1908 | Grodsky | 131—123 |
| 1,082,519 | 12/1913 | Hill | 131—125 |
| 2,789,704 | 4/1957 | Lewin | 131—125 X |
| 2,884,929 | 5/1959 | Wheeler | 131—125 |
| 3,067,754 | 12/1962 | Pinkham et al. | 131—21 |

FOREIGN PATENTS

| | | |
|---|---|---|
| 21,032 | 1907 | Great Britain. |
| 277,931 | 3/1928 | Great Britain. |
| 1,086,688 | 10/1967 | Great Britain. |

SAMUEL KOREN, Primary Examiner

J. H. CZERWONKY, Assistant Examiner